C. FRAZER.
INTERCHANGEABLE CRANK HANGER.
APPLICATION FILED MAY 22, 1913.
1,100,365.
Patented June 16, 1914.
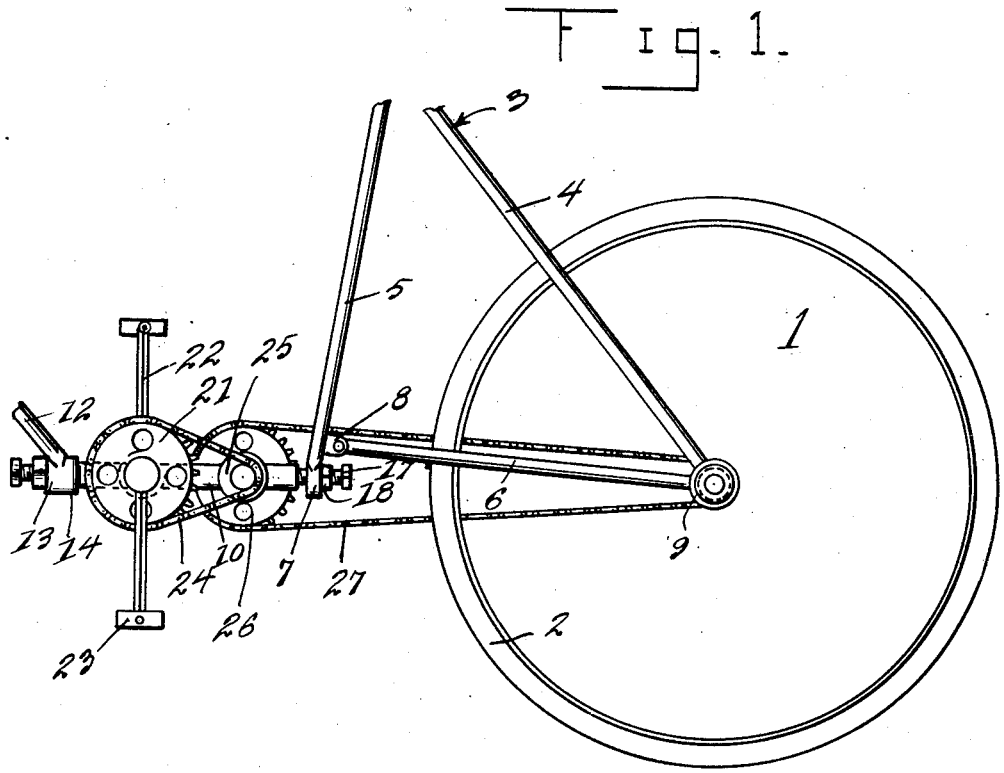
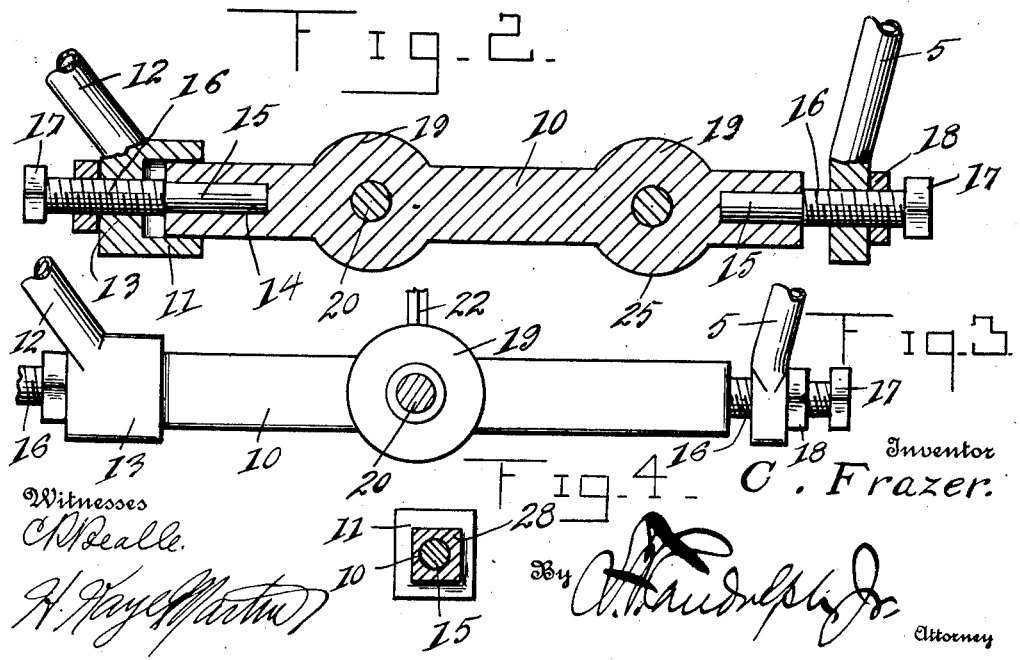

UNITED STATES PATENT OFFICE.

CHARLES FRAZER, OF CHICAGO, ILLINOIS.

INTERCHANGEABLE CRANK-HANGER.

1,100,365.  Specification of Letters Patent.  Patented June 16, 1914.

Application filed May 22, 1913. Serial No. 769,265.

*To all whom it may concern:*

Be it known that I, CHARLES FRAZER, a citizen of the United States, residing at Chicago, in the county of Cook and State of Illinois, have invented certain new and useful Improvements in Interchangeable Crank-Hangers; and I do hereby declare the following to be a full, clear, and exact description of the invention, such as will enable others skilled in the art to which it appertains to make and use the same.

This invention relates to new and useful improvements in velocipedes, and more particularly that class relating to bicycles wherein it is desired to obtain a high speed machine.

The object of my invention is to provide a device of the above character wherein the changing of gears may be effected by the loosening of one or two screws and the removal of the whole crank mechanism, and substituting therefor a different mechanism.

A still further object of my invention is to provide a means for tightening the chain without the necessity of having to true up the rear wheel.

With the above and other objects in view, I will now proceed to describe my invention in the following specification and accompanying drawings, in which, Figure 1 is a side view of a fragment of a bicycle showing my improved crank hanging mechanism in place; Fig. 2 is a detail sectional view of my improved crank hanging mechanism showing the same having two sprockets; Fig. 3 is a detail view in elevation of my improved crank hanger showing one sprocket; and Fig. 4 is a transverse sectional view taken on line 4—4 of Fig. 3.

Referring to the drawings by characters of reference, 1 indicates the usual rear wheel of a bicycle, comprising the usual hub, spokes and rim, the usual tire 2 being secured to the rim in any preferred manner. This wheel 1 is rotatably mounted in the frame, indicated generally at 3, which comprises the bars 4, 5 and 6. The lower end of the bar 5 is provided with a depending ear 7, the use of which will be more fully hereinafter described. A laterally extending ear 8 is provided adjacent the ear 7, and is adapted to connect the inner extremity of the bar 6 to the bar 5. The usual sprocket wheel 9 is carried by the hub of the wheel 1, by means of which the said wheel is rotated.

A crank hanger 10 is supported by means of the ear 7, and a sleeve 11, carried by the front bar of the bicycle frame, as indicated at 12. This sleeve 11 is formed integrally with a depending portion 13 carried by the bar 12. The sleeve 11 is preferably rectangular in cross section, as is clearly illustrated in Fig. 4, and is adapted to receive the squared end of the crank hanger 10.

The crank hanger 10 preferably comprises an elongated bar, having at each end recesses 14, which are adapted to receive the ends 15 of threaded pins 16. These threaded pins are provided at the opposite extremity to the end 15 with a bolt head 17, by means of which the same are adapted to be rotated. A suitable lock nut 18 is provided, by means of which accidental rotation of the pin 16 is eliminated.

Intermediate the ends of the crank hanger 10, I provide the enlarged portions 19, which have apertures extending transversely therethrough, these apertures being adapted to receive the crank shafts 20. These crank shafts 20 carry the usual sprockets 21 and cranks 22, which are provided at their outer extremities with pedals 23. A suitable chain 24 is provided and is adapted to co-act with a sprocket 25 carried by the second of the crank shafts. This sprocket 25 is secured to the end of one of the shafts 20, by means of which the said shaft is adapted to be rotated. A suitable sprocket 26 is secured to the end of the shaft 20 opposite the sprocket 25, and is adapted to receive the chain 27 which transmits power to the sprocket 9 carried by the rear wheel.

In Fig. 3, the second sprocket 26 is eliminated and only one sprocket is carried by the crank hanger, as will be clearly seen upon reference to the drawings.

The end of the crank hanger 10, which enters the sleeve 11, is preferably rectangular, as clearly illustrated at 28, to prevent rotation of the crank hanger when the device is in operation.

With my improved crank hanger it will be seen that upon removal of the pins 16 from the frame, the crank hanger 10 may be easily withdrawn and another substituted, so that in a high gear machine, by a very simple operation, it may be changed to a low gear machine without the use of tools other than an ordinary wrench. The tightening of the chain 27 is obtained through the medium of the screws 16, which extend into the recesses 14 in the ends of the crank hanger, whereby necessity of the usual method of tightening bicycle chains is eliminated, and at no time is the rear wheel apt to get out of true on account of the pull on the chain.

While in the foregoing I have shown and described the preferred embodiment of my invention, I wish it to be understood that I may change the specific arrangements of parts without in any way departing from the spirit and scope of my invention.

Having thus fully described my invention, what I claim is:

1. In combination with a bicycle having a frame, a crank hanger, a sleeve carried by one extremity of a section of the frame, an ear carried by another extremity of a section of the frame, said ear and sleeve being pierced by apertures, threads formed interiorly of said apertures, and threaded pins adapted to enter the apertures and also enter recesses in the crank hanger, whereby the crank hanger is removably secured to the frame.

2. The combination with a bicycle comprising a frame and wheels, of a crank hanger having a recess in each end, enlarged portions formed intermediate the ends of the crank hanger, said enlarged portions having apertures extending transversely therethrough, shafts adapted to extend through the apertures, a sprocket secured to one of said shafts at one end, a second sprocket secured to the shaft at the opposite end, threaded pins adapted to enter the recesses in the ends of the crank hanger, a sprocket carried by the rear wheel of the bicycle, and a chain connecting the last mentioned sprocket with the first mentioned sprockets whereby power is transmitted to the drive wheel.

In testimony whereof I affix my signature in presence of two witnesses.

CHARLES FRAZER.

Witnesses:
ELIZEBETH FRAZER,
RICHARD A. ROELING.

Copies of this patent may be obtained for five cents each, by addressing the "Commissioner of Patents, Washington, D. C."